United States Patent
Gaal et al.

(10) Patent No.: US 11,796,496 B1
(45) Date of Patent: Oct. 24, 2023

(54) INSTRUMENT AND METHOD FOR MEASURING THERMAL DIFFUSIVITY OF MATERIALS

(71) Applicant: Arrigo Enterprises, LLC, Boulder, CO (US)

(72) Inventors: Peter S. Gaal, Boulder, CO (US); Zachary D. Withrow, Plattville, CO (US)

(73) Assignee: ARRIGO ENTERPRISES, LLC, Boulder, CO (US)

( * ) Notice: Subject to any disclaimer, the term of this patent is extended or adjusted under 35 U.S.C. 154(b) by 0 days.

(21) Appl. No.: 17/898,435

(22) Filed: Aug. 29, 2022

(51) Int. Cl.
*G01N 25/18* (2006.01)
*G01N 1/44* (2006.01)
*G01N 21/01* (2006.01)
*G01N 21/13* (2006.01)
*G01N 21/17* (2006.01)

(52) U.S. Cl.
CPC ............... *G01N 25/18* (2013.01); *G01N 1/44* (2013.01); *G01N 21/01* (2013.01); *G01N 21/13* (2013.01); *G01N 21/1717* (2013.01); *G01N 2021/135* (2013.01); *G01N 2021/1731* (2013.01)

(58) Field of Classification Search
CPC .......... G01N 25/18; G01N 1/44; G01N 21/01; G01N 21/13; G01N 21/1717; G01N 2021/135; G01N 2021/1731
See application file for complete search history.

(56) References Cited

U.S. PATENT DOCUMENTS

| | | | |
|---|---|---|---|
| 3,165,915 A | 1/1965 | Parker et al. | |
| 4,381,154 A | 4/1983 | Hammond, III | |
| 4,874,250 A | 10/1989 | Gonner | |
| 4,928,254 A | 5/1990 | Knudsen et al. | |
| 5,439,291 A * | 8/1995 | Reading | G01N 25/4866 374/33 |
| 6,375,349 B1 * | 4/2002 | Gaal | G01N 25/18 374/45 |
| 7,407,325 B2 * | 8/2008 | Watanabe | G01N 25/18 374/9 |

(Continued)

FOREIGN PATENT DOCUMENTS

DE         4301987 A1      7/1994

OTHER PUBLICATIONS

Parker, WJ et al., "Flash Method of Determining Thermal Diffusivity Heat Capacity and Thermal Conductivity", J. Appl. Phys, 32, vol. 9, 1979 (1961).

(Continued)

*Primary Examiner* — Sang H Nguyen (57) ABSTRACT

An instrument for determining thermal diffusivity of disc shaped opaque solid or quasi solid materials using a high intensity short duration flash of light from a single LED, a planar LED array, or laser diode source is disclosed. This instrument comprises an axially and radially indexed cylindrical sample holder able to accommodate a plurality of test samples and sequentially bring them into a designated testing position to expose one face of each sample to the flash of light while the obverse face of the disc is observed by a temperature measuring device, for the purpose of recording the attendant thermal excursion. An improved calculating method, based on empirical data observed during each test, is used for calculating thermal diffusivity.

11 Claims, 6 Drawing Sheets

(56) References Cited

U.S. PATENT DOCUMENTS

| | | | | |
|---|---|---|---|---|
| 2005/0078732 | A1* | 4/2005 | de Ris | G01N 25/50 374/179 |
| 2008/0019887 | A1* | 1/2008 | Lohmann | G01N 21/05 422/243 |
| 2009/0110025 | A1* | 4/2009 | Kim | G01N 25/18 374/43 |
| 2016/0223479 | A1* | 8/2016 | Thermitus | G01N 25/18 |
| 2018/0246032 | A1* | 8/2018 | Li | G01J 3/2823 |
| 2020/0408806 | A1* | 12/2020 | Bhargava | G01Q 60/38 |

OTHER PUBLICATIONS

Walt, DA, "Theory of Thermal Diffusivity of Pulse Technique," Br. J. Apply. Phys., 17, vol. 231, 1966.

Righini, F et al. "Pulse Method of Thermal Diffusivity Measurements, A Review", High Temperature-High Pressure, 5, 1973, pp. 481-501.

Taylor, RE, "Heat Pulse Diffusivity Measurements", High Temperatures, II, vol. 43, 1979.

Heckman, RC, "Error Analysis of the Flash Diffusivity Technique", Thermal Conductivity 14, Klemens, PG and Chu, TK, Eds. Plenum Publishing Corp., NY, 1974, pp. 491-498.

Sweet, JN, "Effect of Experimental Variables on Flash Termal diffusivity Data Analysis," Thermal Conductivity 20, Hasselman, DPH, Ed. Plenum Publishing Corp, NY. See also Sweet JN, "Data Analysis Method for Flash Diffusivity Experiments", Sandia National Laboratory Report SAND 89-0260, (Available from NTIS), Feb. 1989.

Cape, JA and Lehman, GW, "Temperature and Finitie Pulse-Time Effects in teh Flash Method for Measuring Thermal Diffusivity", J. Appl. Phys., 34, vol. 1909, 1963.

Taylor, RE and Clark, III, LM, "finite Pulse Time Effects in Flash Diffusivity Method" High Temperature-High Pressure, 6, vol. 65, 1974.

Larson, KB and Koyanan, K, "Correction for Finite Pulse-Time Effects in Very Thin Samples using the Flash Method of Measuring Thermal Diffusivity" J. Appl. Phys., 38, vol. 465, 1967.

Henning, DC and Parker, R, "Transienty Response of an Intrinsic Thermocouple", J. Heat Transfer, Transations of ASME, 39, vol. 146, 1969.

Heckman, RC, "Intrinsic Thermocouples in Thermal Diffusivity Experiments", Proceedings Seventh Symposium on Thermophysical Properties (Cezairliya, A., Ed.), ASME, NY, 159, 1977.

Clark, LM, III, and Taylor RE, "Raditions Loss in the Flash Method of Thermal Diffusivity", J. Appl. Phys., 46, vol. 714, 1975.

Cowan, RD, "Pulse Method of Measuring Thermal Diffusivity at High Temperatures", J. Appl. Phys, 34, vol. 926, 1963.

Carslaw, HS and Jeager, JC, Conduction of Heat in Solids, 2nd ed., Oxford University Press, London, 1959.

Taylor, RE and Cape, JA, "Finite Pulse-Time Effects in the Flash Diffusivity Technique", Appl Phys. Lett., 5 (10), 1964, p. 210.

Azumi, T, and Takahashi, Y., "Novel Finite Pulse-Width Correction in Flash Thermal Diffusivity Measurement", Rev. Sci. Instrum., 52 (9), 1981, p. 1411.

ASTM International, Standard E1461-07 Conshohocken, PA (2007).

H Want, R. Dinwiddle, P. Gaal, "Multiple Station Thermal Diffusivity Instrument", Materials Science, Dec. 31, 1995.

* cited by examiner

INSTRUMENT AND METHOD FOR MEASURING THERMAL DIFFUSIVITY OF MATERIALS

The following is an application under 35 U.S.C. 111(a).

FIELD

The disclosure is in the field of a device and method for measuring thermal diffusivity.

BACKGROUND

Thermal diffusivity is an intrinsic property of all materials. It describes the rate with which heat spreads through a material, from a hotter to a colder region. Thermal diffusivity plays an important role in thermal design and modeling.

SUMMARY OF THE DISCLOSURE

An instrument for determining thermal diffusivity of disc shaped opaque solid or quasi solid materials using a high intensity short duration flash of light from a single LED, a planar LED array, or laser diode source is disclosed. This instrument comprises an axially and radially indexed cylindrical sample holder able to accommodate a plurality of test samples and sequentially bring them into a designated testing position to expose one face of each sample to the flash of light while the obverse face of the disc is monitored by a temperature measuring device, for the purpose of recording the attendant thermal excursion. An improved calculating method, based on empirical data observed during each test, is used for calculating thermal diffusivity.

This disclosure relates to the field of thermal diffusivity and more specifically an instrument and method for measuring thermal diffusivity of materials. The disclosure includes, in a first example, an instrument for measuring thermal diffusivity of materials, the instrument consisting of a system for measuring thermal diffusivity comprising a light emitting diode (LED) light source, wherein at least one light pulse from the LED light source impinges on one face of an opaque solid material sample of uniform thickness, L, producing a time dependent temperature evolution, or thermogram, on the opposite side of the sample, and wherein a means to calculate included in the system analyzes the thermogram and calculates the time $t_{1/2}$ it takes for the temperature rise to reach ½ of its maximum value and calculates the thermal diffusivity a of the sample, according to the formula: $\alpha = c \cdot L^2 / t_{1/2}$, where $c = 0.13879$ for the $t_{1/2}$ point on said temperature rise. This instrument may comprise at least one LED, a light concentrator, a light columnator, and a light transmission device. The LED light source or at least one laser diode is controlled by a controller with a program which commands production at least one light pulse. When at least two light pulses of predetermined, and different duration and intensity is produced, and wherein the program calculates thermal diffusivity using the at least two light pulses, denoted $P_1$, $P_2$, each having a $t_{1/2}$ associated with the at least two light pulses, denoted $(t_{1/2})_1$, $(t_{1/2})_2$, and having the at least two said $t_{1/2}$ values subject to a regression analysis versus their corresponding pulse durations, the resultant function then extrapolated to a pulse duration that is shorter than 100 ms (milliseconds), to obtain the corresponding $t_{1/2}$, which is then used in the formula: $\alpha = c \cdot L^2 / t_{1/2}$, where $c = 0.13879$. In another instance, the LED light source or laser diode may be commanded to provide a plurality of pulses according to proportional-integral-derivative (PID) control principles to heat said sample to a desired temperature prior to the above-mentioned time pulses for the thermal diffusivity measurement.

The disclosure provides in a second example an instrument for measuring thermal diffusivity of materials, the instrument comprising: a) a thermally controlled environment; b) a sample holder comprising at least two sample cavities; c) a sleeve within the thermally controlled environment for receiving the sample holder, comprising openings on a top and bottom side; and d) an indexer. The sample holder may be cylindrical in shape or have a polygonal cross section. The indexer may move the sample holder axially and radially in reference to the sleeve, either sequentially or concurrently. In one embodiment, the at least two sample cavities are radially displaced from each other, or each sample cavity may be part of a row with each such row parallel with the longitudinal axis of the sample holder, and wherein each row has at least one sample cavity. Further, the at least two sample cavities extend through the sample holder, each comprising an opening on a first side and an opening on a second side, the opening on the first side being larger than the opening on the second side concentric with each other, and placed 180° from each other, interconnected with a passage and wherein said larger opening houses a sample, and wherein said sleeve prevents the sample From falling out of the holder when the holder is rotated in reference to the sleeve, which is kept stationary. The axis of the concentric openings is perpendicular to the longitudinal axis of the sample holder The sample holder and sleeve can be withdrawn from the thermal environment for sample loading and unloading. The indexer may comprise: a linear actuator; a rotary actuator; a linear position transducer; a rotary position transducer; a spline member; and a first magnet and a second magnet. In this second example instrument with indexer just described, the instrument is configured wherein: a movable end of the linear actuator is connected to a first end of the spline member with a no-gap axial/rotary coupling; the rotary actuator is connected to the spline member with a radially movable, but axially captioned collar that has a pin affixed to it, the pin protrudes into a longitudinal groove of the spline member causing the rotation of the spline member when the collar is rotated; the no-gap rotary/axial coupling comprising the first magnet connected to the first end of the spline member and the second magnet connected to a movable end of the linear actuator; the first magnet contacts the second magnet; and wherein the movable end of the linear position transducer is coupled to the movable end of the linear actuator, in an axially restrained and radially free to slip coupling.

A third example instrument may comprise: a thermally controlled environment; a sample holder, sleeve, and an indexer, wherein the sample holder comprises at least two cavities radially displaced from each other and capable of holding at least two samples, the at least two cavities having one opening larger than the other, and the sleeve comprising at least two openings each at least as wide as the large opening of the at least two cavities and oriented 180° from each other on the surface; a temperature rise detector comprising a temperature sensor and recordation device; a light source, the light source comprising of at least one light emitting device, a light concentrator, a columnating device, and a light transmitting device; and a program calculates thermal diffusivity using at least two pulses from the light source of predetermined and increasing durations, denoted $P_1$, $P_2$, each having a $t_{1/2}$ associated with it, denoted $(t_{1/2})_1$, $(t_{1/2})_2$, and having at least two said $t_{1/2}$ values subject to a regression analysis versus their corresponding pulse durations, and the resultant function then extrapolated to a pulse duration that is shorter than 100 ms to obtain the corresponding $t_{1/2}$, which is then used in the calculation: $\alpha=c \cdot L^2/t_{1/2}$, where c=0.13879. The light source of this third example instrument may comprise at least one LED light. In another embodiment the light source may comprise at least one laser diode. Multiple instruments of any of the foregoing examples may be controlled by a single controller and program.

The disclosure further includes an instrument of a fourth example for measuring thermal diffusivity, the instrument comprising: a means for creating a thermally stable environment; a means for providing an LED light source capable of raising the temperature of at least one sample; a means for holding at least two samples radially displaced from each other; a means for aligning a first side of the at least one sample with the LED light source; a means for reading a temperature change of a second side of the at least one sample and recording a thermogram; a means for calculating the thermal diffusivity from the thermogram; and a means for having the at least two radially displaced samples each part of a row of axially displaced samples. This fourth example instrument wherein the means for calculating the thermal diffusivity of at least one sample comprises a software program coded to calculate thermal diffusivity using a sequence of at least two light pulses of predetermined and increasing durations, denoted $P_1$, $P_2$, each having a $t_{1/2}$ associated with it, denoted $(t_{1/2})_1$, $(t_{1/2})_2$, and having at least two said $t_{1/2}$ values subject to a regression analysis versus their corresponding pulse durations, and the resultant function then extrapolated to a pulse duration that is shorter than 100 ms to obtain the corresponding $t_{1/2}$, which is then used in the calculation: $\alpha=c \cdot L^2/t_{1/2}$, where c=0.13879.

The disclosure provides a method for measuring thermal diffusivity, the method comprising the steps of: creating a thermally stable environment; illuminating a first side of at least one sample using at least one light pulse produced by a LED or laser diode light source; measuring a temperature rise on a second side of at the least one sample; recording the temperature rise to create a thermogram; and calculating thermal diffusivity, a, using a formula: $\alpha=c \cdot L^2/t_{1/2}$, where c=0.13879 for $t_{1/2}$, and $t_{1/2}$ is derived from a regression analysis of $t_{1/2}$ values, $(t_{1/2})_1$, $(t_{1/2})_2$, obtained from the thermogram associated with predetermined sequence and duration of at least two light pulses, denoted $P_1$, $P_2$, with the resultant $t_{1/2}$, $(t_{1/2})_1$, $(t_{1/2})_2$ corresponding to a pulse duration shorter than 100 ms.

Before explaining the disclosed embodiments of the present disclosure in detail, it is to be understood that the disclosure is not limited in its application to the details of the particular arrangement shown, since the disclosure is capable of other embodiments. Also, the terminology used herein is for the purpose of description and not of limitation.

PRIOR ART

One of the most elegant and frequently used method of evaluating thermal diffusion was first developed by Parker et. al. (J. Appl. Phys., 32(9): 1679-1684, 1961). This method is illustrated schematically in FIG. 1. The method uses a high intensity light pulse 100 from a Xenon light source or pulse laser 2, which falls on one face (face A) of a small disk-shaped sample 1 and measures the temperature evolution 101 of the opposite face (face B) which is temperature rise as a function of time. This temperature evolution data is used to create a thermogram T, illustrated in FIG. 2.

Figure 2:
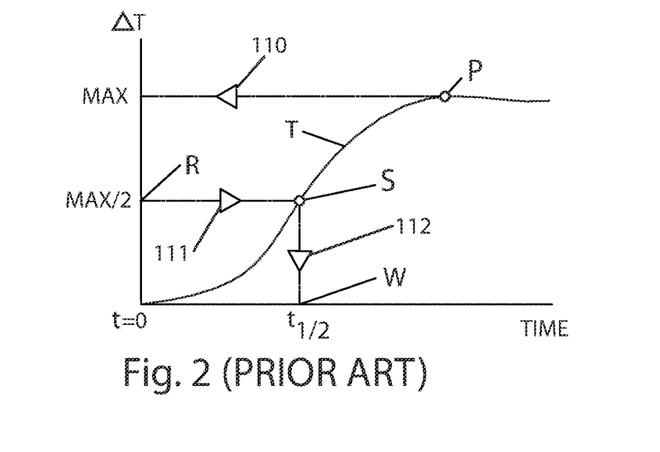
FIG. 2 is a graph of a thermogram obtained by a prior art flash diffusivity apparatus.

Various points obtained from this characteristic thermogram can be used to derive thermal diffusivity. For example, once the maximum temperature excursion point (P) is determined in terms of ($\Delta T$), it is projected 110 to the $\Delta T$ axis, intercepts it where marked MAX, then 50% of this $\Delta T$ value, marked MAX/2 is calculated and shown as represented by point (R), then it is projected back onto the thermogram 111, intercepting it at point (S). The time at which point (S) occurs is called "half-max time" as projected 112 to the TIME axis to point (W), yielding $t_{1/2}$. L is the thickness of the sample. This characteristic time was shown to relate to thermal diffusivity ($\alpha$), as $$\alpha = c \cdot L^2 / t_{1/2} \qquad \text{Equation 1}$$

where c=0.13879 for $t_{1/2}$.

Other points on the thermogram have analogous relationships, with correspondingly changing values for constants c. Equation 1 is based on a theoretical model assuming an infinitesimally short pulse and no thermal losses from the sample.

This method is commonly used and referred to as the "flash method" for determining thermal diffusivity. It is applicable for opaque, homogeneous solid, or quasi-solid samples of uniform thickness, where quasi-solid is meant to refer to materials that show no dimensional deformation, as long as mechanical forces acting upon it remain constant, or encapsulated non-solids and transparent materials, made to mimic solid samples. It is a highly favored for being fast, accurate, and most importantly, not needing the knowledge of the quantity of heat conveyed by the pulse 100. Since thermal diffusivity ($\alpha$) is related to thermal conductivity (k), specific heat capacity (Cp) and density ($\rho$), as shown in Equation (2), $$\alpha = k / (\rho \cdot Cp) \qquad \text{Equation 2}$$

the flash method fast became the method of choice for derivative measurement of thermal conductivity.

Figure 1:
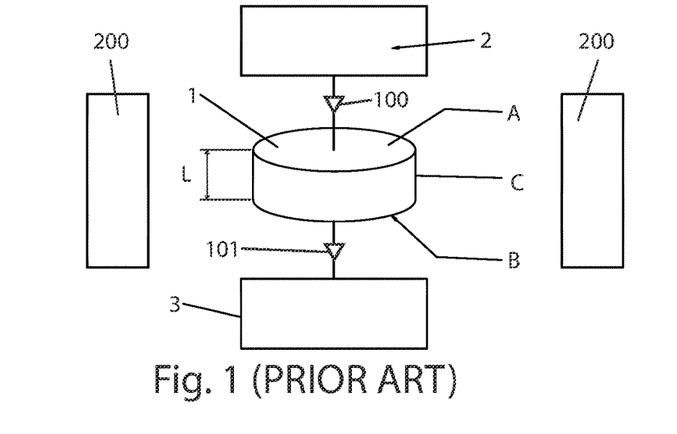
FIG. 1 is a schematic view of the components of a prior art flash diffusivity apparatus.

Typically, for testing at temperatures other than ambient, the specimen is enclosed in a thermally controlled environment, such as furnace or cryostat 200, FIG. 1. With elevated temperatures, heat losses from the sample promote non uni-axial heat flow after the pulse energy is adsorbed such as radiative losses from the surface of face A, FIG. 1, the surface of face B, and edge losses C, each causing deviations from the basic relationship in Equation 1.

Thermally Controlled Environments are used to transfer heat into the sample, and often to the sample holder via radiation, conduction, and convection. In one instance for testing molten droplets of metals high frequency induction heating was used to elevate the temperature of the levitated sample from within.

Between 0.1 to 3 Joule pulse energy produces an analyzable thermogram which is a depiction of temperature rise as a function of time for face B of the sample 1 opposite of the face A, upon which the energy of the light pulse is deposited. This temperature evolution data is referred to as a thermogram, on a sample having 0.5 in diameter and 0.08 in thickness. The presently disclosed embodiment, using an at least 10,000 lumen LED source, yields sufficient energy with a 1000 ms duration pulse.

Common practice with light sources showed that pulse widths extending into hundreds, or thousands of milliseconds may distort the thermogram obtained from face FIG. 1, B, and adversely affect the resulting data. For this reason, a number of analytical corrections appeared in the literature, generally referred to as pulse width corrections. These were all based on analyzing and manipulating the test result obtained from the thermogram to closely approximate a theoretical thermogram, which assumes an infinitesimally short pulse and no heat losses. Severe losses from faces A, B and surface C may also lead to further data degeneration. Analytical corrections have also been published to correct this distortion as well. Further complicating matters is the fact that every material and the surface preparations of each sample greatly influence its emissivity, and consequentially radiated heat losses from it. As a result, a correction obtained for one sample may differ from the correction to be applied for another sample, even if the material is the same and certainly even more at different temperatures. Over the decades, these corrections were based on theoretical predictions and were applied to the data derived from thermograms at the end of the test. They provided no way to vary test parameters in real time, only manipulate obtained data after testing. It is a known fact that the thermal diffusivity of all materials changes with temperature, therefore there is the need to test them at temperatures other than ambient and over a range of temperatures. In any practical device for testing at other than ambient, first the sample must be enclosed in a precisely controlled thermal volume, such as what is within the uniform portion of the hot zone of a furnace and provide a way to firmly support the sample.

In prior art, the xenon light source 2, FIG. 1, directly shined upon the sample seated in a holder. This proved to be very limited in operation, as such a source has nearly hemispherical light emission, and only a very small portion of its energy was reaching the sample. This was remedied with the use of properly positioned elliptical or parabolic concentrating mirrors, coupled with other collimating components. Also, pulse lasers, ruby, YAG, and Nd-glass, became the choice of light source, due to their inherently collimated beam, extremely high-power density and comparatively short pulse. Collimation without large divergence is a practical necessity to reach into the furnace or cryostat. Both types of sources brought with them very high electrical noise, radiated and conducted through wiring, emanating from the high voltage (>800 V) discharge of very large capacitors and a very high voltage (>10,000 V DC) trigger pulse through the xenon flash lamp, for both the direct xenon flash or the xenon pumped pulse laser. Flash diffusivity instruments based on the use of either type pulse source have been available for a while, all of them suffering from the extensive electrical noise emission, requiring complex mitigative hardware and software measures, at great cost.

Figure 3:
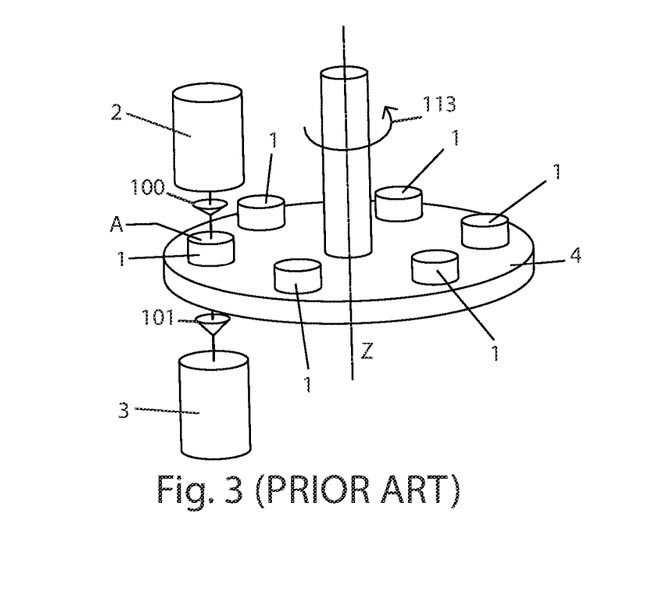
FIGS. 3 and 4 are depictions of prior art multi-sample flash diffusivity devices.

In a practical device, one of the fundamental requirements for any sample holder is to physically support the solid sample while exposing one face A, FIG. 1 of the sample to the pulse from the pulse source 2 and presenting the other face B to the temperature rise detector 3. Initially measuring instruments were equipped with a holder for a single sample. For purposes of the disclosure herein a solid may be a solid or quasi solid. It takes only a few seconds to obtain data to develop the thermogram produced by a single pulse, but it takes several magnitudes longer to reach equilibrium temperature for the sample before the pulse is triggered. For example, a test cycle to reach a maximum temperature of 2500° C. with 8 to 10 intermediate temperatures, can easily take 10-20 hours. To make testing more time efficient, equipment with multi-specimen sample holders were devised. As shown in FIG. 3, the first version used a circular platform 4 with as many as six radially spaced samples 1 in the plane of the platform, with the rotational 113 indexing around axis Z, which is perpendicular to the plane of the samples 1 and with the plane of the sample holder 4. These samples were then sequentially pulsed 100 and the rear temperature evolution 101 recorded. In another prior art version shown in FIG. 4, a single or multiple linear sequence of samples 1 in the plane of a platform 5 was devised.

Figure 4:
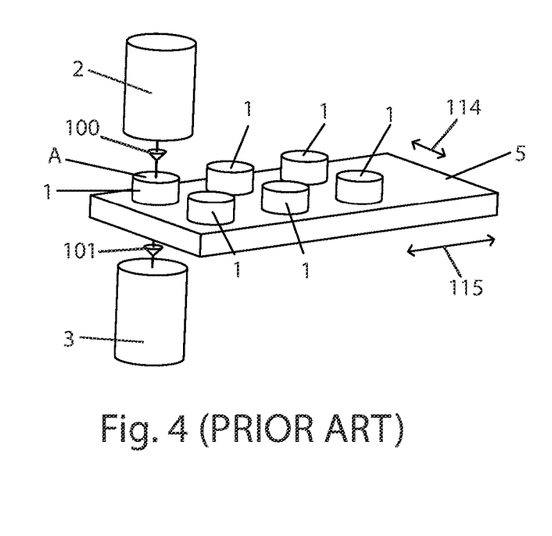

In all cases, the planes of all sample faces (A) are in a plane parallel with the plane of the holder and that of the indexing 113, lateral displacement 114 and longitudinal displacement 115. In contrast, the present disclosure introduced a rotational indexer.

DETAILED DESCRIPTION

The flash diffusivity apparatus of the present disclosure comprises a thermally controlled environment, a multi-sample holder moved via a concurrent radial and axial indexer, a temperature rise detector, a LED light pulse source to raise the temperature of a sample by the light pulse emitted from the LED, electronic circuitry connected to a computer with operating software to control the device, and a new analysis algorithm, based on an empirical model evaluation in real time, after pulse enabling the ability to vary test parameters during a test, rather than hypothetical analysis and corrections applied post test data, as in prior art.

1. Thermally Controlled Environment

Figure 5:
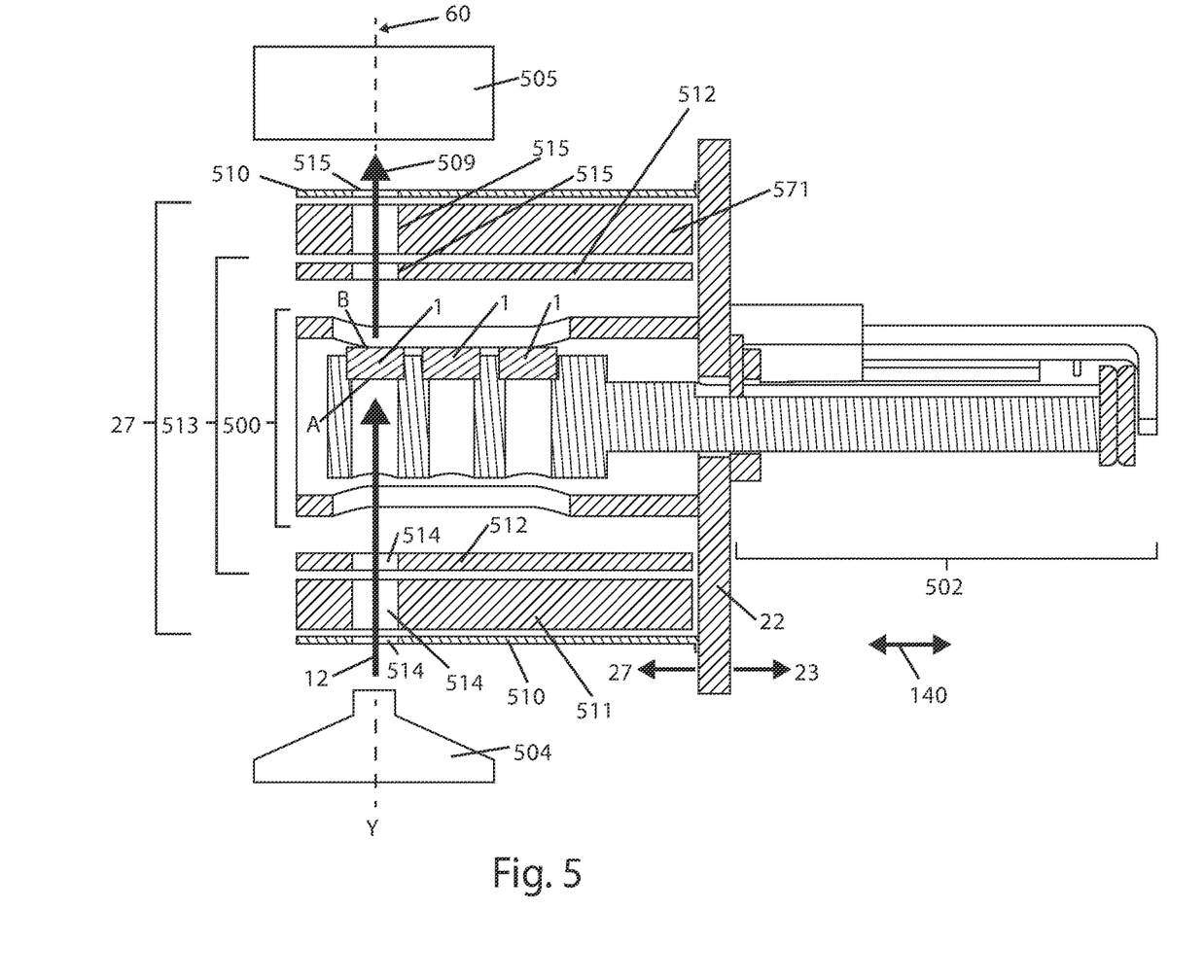
FIG. 5 is a side view in section of an embodiment of the flash diffusivity instrument of the present disclosure.

The schematic representation in FIG. 5 shows for illustrative purposes, and to place the elements of the disclosure in context, means to produce a thermally controlled environment 27 having a highly uniform (at least +/−2° C./in) and stable (at least +/−1° C./min) thermal volume 500 within its hot zone 513 at any set temperature, after sufficient equilibration time. The thermally controlled environment comprises a temperature sensor, heater, and controller. It is also possible to heat the sample directly by prolonged light pulses applied directly to the sample 1, using a proportional integral derivative PID control algorithm for meeting a desired temperature without a separate heater 512, and then to apply the light pulse for the purpose of the measurement. The thermally controlled environment 27, which may also be termed a furnace or cryostat, comprises an outer shell 510 housing the insulation 511, and a heater or heating element 512. The thermally controlled environment depicted for the present disclosure is capped on one longitudinal end with a movable end plate 22 which also serves as base or the sample support structure, comprising a sample holder and sleeve, and indexer 502. The thermally controlled environment including the end plate/base 22 is enclosed by the outer shell 510 and insulation 511 to maintain internal temperature although the enclosure wall opposite of the end plate 22 is not shown in the diagram for purposes of explanation.

The thermally controlled environment 27 is equipped with two sets of passages that allow light to pass therethrough, 514 and 515, each set cutting through shell 510, insulation 511 and heating element 512. The two sets are coaxial with each other, as well as the optical axis Y of the light pulse source 504, and the temperature rise sensor 505.

When the longitudinal axis of disk-shaped sample 1 is brought into coincidence with axis Y, the light pulse 12 can impinge on the face A, the illuminated face, of said sample. This position will be heretofore referred to as test position 60.

In the present disclosure, multiple light pulses of varying intensity in close sequence, and distributed according to Proportional-Integral-Derivative (PID) control principles, may be used to heat the sample to a desired temperature before the test pulse is issued. This direct heating involves no heat transfer from an external heater, therefore it is a means for generating a thermally controlled environment.

2. Multi-Sample Holder Structure

Figure 6:
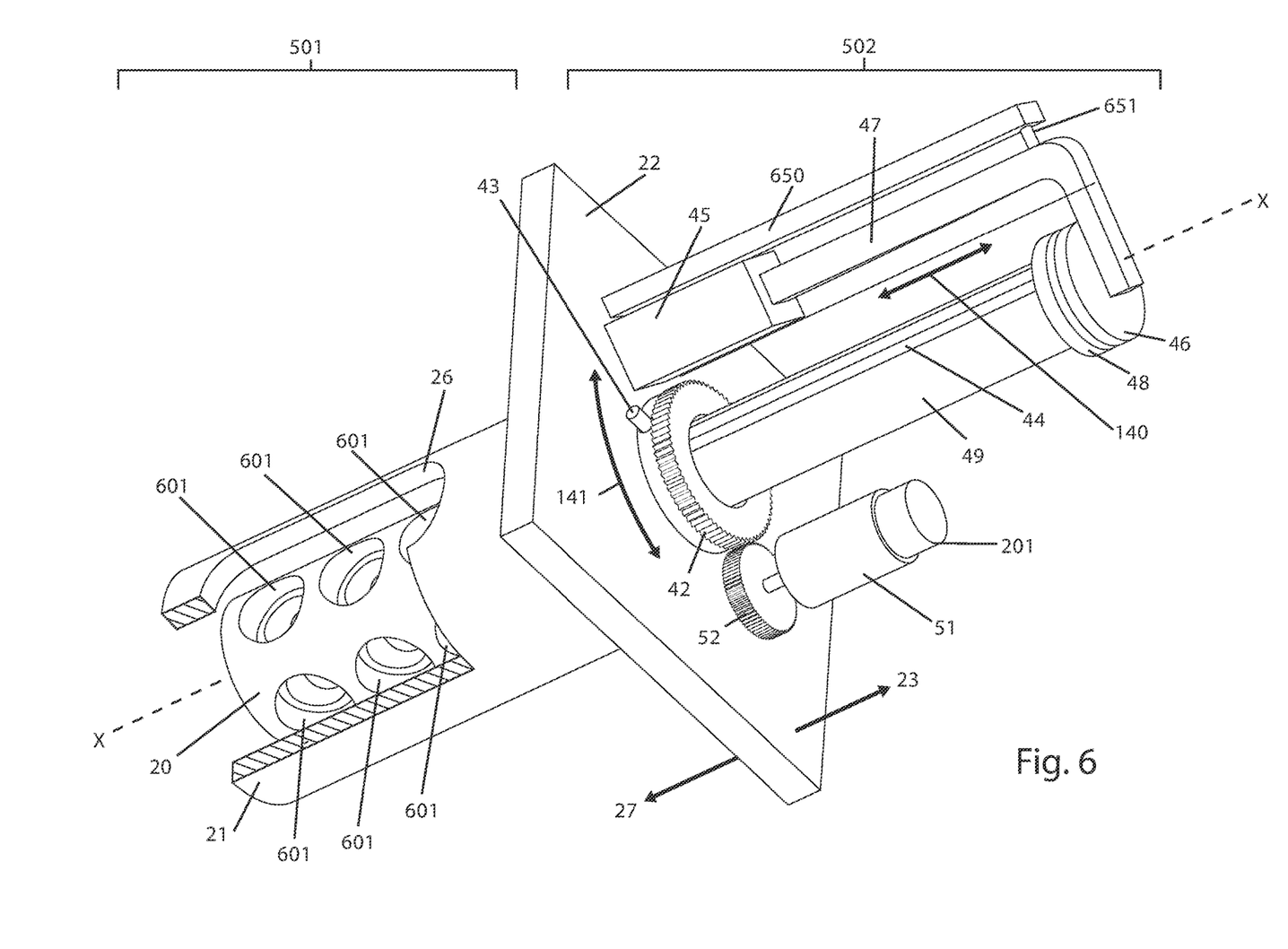
FIG. 6 is an orthogonal view in partial section of the sample holder structure and indexing mechanism.
Figures 7, 9:
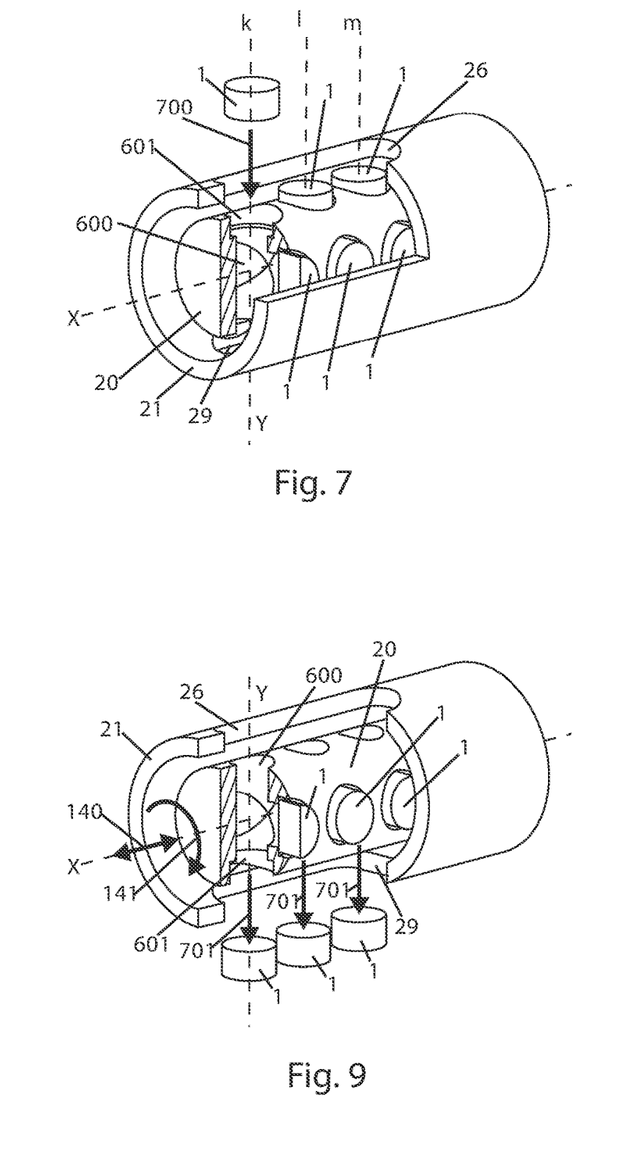
FIG. 7 is an orthogonal view in partial section of the sample holder structure with the sample holder in the loading position.
FIG. 9 is an orthogonal view in partial section of the sample holder structure with the sample holder in the unloading position.

A primary feature of the disclosure is a compound of axial translation and rotary indexed sample holder structure FIG. 6, 501. As shown in FIG. 6, the sample holder structure 501 is comprised of a multi-sample holder 20 and a sleeve 21 surrounding it. The sample holder 20 may comprise a cylindrical body as shown, or have a polygonal cross section, the polygon having at least three sides, at least four sides, at least five sides, or at least six sides or more. The sleeve 21 serves to hold the samples in their places as also shown in FIG. 7, except in the test position, as shown in FIG. 9. The sleeve 21 is rigidly mounted to the movable end plate/sample holder base 22 which separates the interior environmental space of the thermally controlled environment 27 from the ambient space of the surroundings 23. One may envision that the base 22 forms part of a wall of the thermally controlled environment 27. The sample holder 20 and its function is further described in FIGS. 7-10. It comprises at least one sample placement cavity 601, on the cylindrical surface of the sample holder, each continuing with a coaxial light passage 600 having an opening on one side of the cylinder (first face) that is of smaller diameter than the opening to the opposite surface, the second face, of the cylinder. The larger cavity opening is of slightly larger size yet same cross-sectional shape as the sample(s) 1, allowing placement and removal without interference. The depth of each indentation is sufficient to accept said sample(s) 1 with none of the sample protruding and interfering with the sleeve 21 or impeding rotation of the sample holder 20 inside its cylindrical bore. and the openings are concentric with each other, and are along an axis with this axis being perpendicular to the longitudinal axis of the sample holder. These interconnected and concentric cavities having one opening larger than the other, placed 180° from each other.

This disclosure shows cylindrical disk-shaped samples throughout for illustrative purposes, however, one may envision samples of other shapes, such as rectangular slabs, be employed in an embodiment, without impact on the otherwise disclosed details.

FIG. 7 presents an example of a configuration for a sample holder 20 for six solid samples 1. The first row of samples 1 are in axial positions k, l and m, where the plane defined by k, l and m, respectively, and also includes the longitudinal axis of the cylindrical sample. While the preferred configuration for a cavity 601 comprises of a tubular indentation, a polygonal shaped indentations is also possible for samples other than circular disks, most likely coupled with a similar shaped light passages or cavities. Normally, samples below 0.125 inches (in) or above 2 in diameter are not encouraged, for practical reasons. Typical thicknesses vary from 0.020 to 0.200 in, depending on the material. A typical sample 1 is 0.500 or 1.00 inches in diameter and 0.08 to 0.125 inches in thickness.

Figure 8:
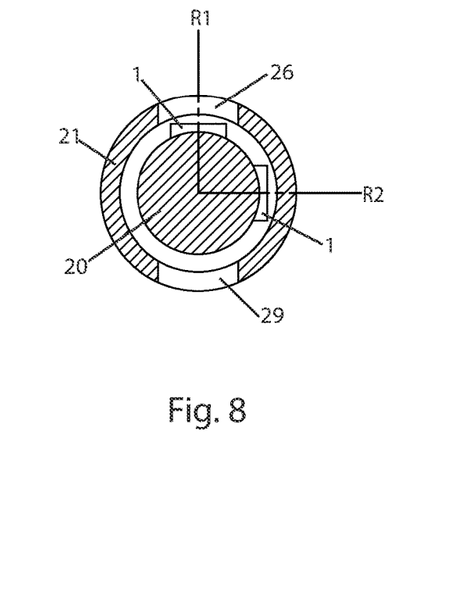
FIG. 8 is a view of the sample holder structure in the loading position, cut perpendicular to the X axis on FIG. 7.
Figure 10:
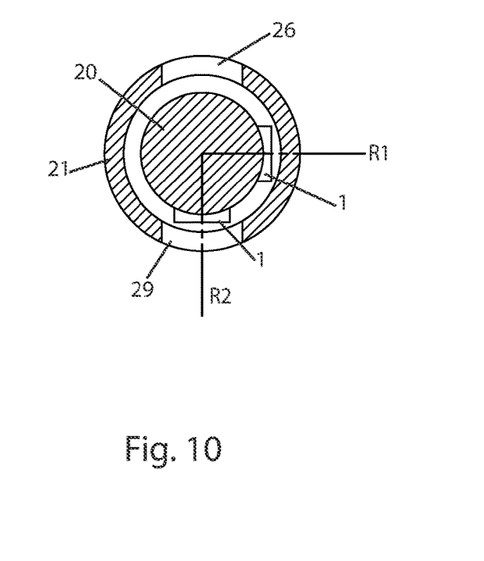
FIG. 10 is a view of the sample holder structure in the unloading position, cut perpendicular to the X axis on FIG. 9.

Rows of cavities 601 in the sample holder 20 are arranged radially displaced from each other ($R_1$, $R_2$), as shown on FIG. 8 thereby having at least two samples radially displaced from each other. Adjacent cavities may vary in size as well as shape, as desired. The number of cavities in a row or the number of rows is only limited by practical considerations and could be as few as 1 or 2, 3 or 4, or six or more. In all configurations, adjacent cavities may not encroach in the space of any adjacent cavity. Thus, the number of such radially indexed rows is only limited by the circumference of the holder. Said rows may have the placements radially aligned or staggered for optimum placements per unit length of holder. An example embodiment of axially aligned two rows of three placements each is presented throughout this disclosure, while 1 to 30 cavities in a row and 1 to 10 rows, is considered practical, with no limitation on the number of cavities whatsoever. The sleeve 21, FIG. 7, surrounding the holder 20 is equipped with two slots 26 and 29 opposite of each other. The length of each slot is such as to fully expose all cavities in a row when the vertical axis of the cavities is coincidental with the optical axis Y.

Loading samples 1, FIG. 6 into the sample cavities 601 is accomplished by retracting the sample holder structure 501, FIG. 5 by moving the movable base 22 to which the sample holder structure 501 is attached far enough out of the thermal environment 27, so as to fully expose and access slots 26 and 29. In this position, FIG. 7, samples 1 are placed 700 into individual cavities 601 coinciding with positions k, l, m, in rotational index $R_1$ through slot 26. After rotating 141 said holder 20 a sufficient amount angularly to reach $R_2$, bringing the next row of placements into coincidence with slot 26, multiple samples 1 are loaded into this row of cavities, similarly as was described above for $R_1$. Meanwhile, samples 1 in radial position $R_1$ are held captive in their respective cavities 601 by the inner wall of the sleeve 21, as shown in FIG. 8. The process is repeated for additional radial sample locations 601. For illustrative purposes only, FIG. 7 shows 2 radial positions, $R_1$ and $R_2$ and axial positions k, l, and m. For unloading, the sample holder 20 is rotated 180° for each placement row, FIG. 9, from its respective loading position to an unloading position, and the samples 1 are allowed to fall out 701 through slot 29. During a test sequence, loaded samples 1 are never brought into coincidence with the unloading radial position. It may be envisioned that the sample holder may retract far enough out of the base 22 to load the samples without moving the base 22 in an alternate design.

While the coincidence of the X axis to horizontal is not critical, preferred operation is obtained close to horizontal, with the loading slot 26 on holder 20 being on top.

Using the previously defined designations, the placements along a longitudinal axis X as k, l, m . . . z in FIG. 7 and along circumferential orientation $R_1$, $R_2$, $R_3$ . . . $R_n$, FIG. 8, a test sequence could consist of laterally translating 140, FIG. 6, the multi-sample holder structure 20 to bring $R_{1k}$ into test position, as shown in context in FIG. 5, 60, then $R_{2k}$, $R_{1k}$ etc., then $R_{1l}$, $R_{2l}$ and so on. The above sequence may be done accomplished by either sequential or concurrent indexing.

Another notable advantage of this axial/radial indexing configuration is that it requires a considerably smaller thermal volume within the uniform heat zone of the thermally controlled environment 27 that any of the previous multi-specimen holders (such as the circular platform FIG. 1, 4 cited earlier), thus reducing the per-sample thermal volume requirement, FIG. 5, 513, which saves energy and thereby offers greener operations. While a six-sample disk holder FIG. 1, 4 requires at a minimum 2.5 in diameter×2 in uniform thermal volume in the hot zone of a 2500° C. thermally controlled environment 27 (equal to 1.6 $in^3$/sample), the disclosure's indexed sample holder structure 501 only needs a space of 1.5 in diameter×2 in long thermal volume for 9 samples, corresponding to 0.4 $in^3$/sample, a nearly 75% reduction in needed energy, and thermal pollution of the environment.

Referring to FIG. 5, The multi-sample holder structure, as described above, supports one or several samples, and with controlled axial and radial motion of the sample holder 20, in reference to the stationary sleeve 21, provides means to bring a selected samples axis, which is perpendicular to its face A, coincident with the axis of the light beam 12 emanating from the light source, whereby it provides means to align the first side of the selected sample 1A, facing the pulse source. Concurrently the same means allows the second side of the above sample, 1B to face a suitable temperature rise detector 505, to sense the radiated signal 509, upon impingement of the light pulse 12. By equipping the sample holder 20, with several radially displaced rows of cavities as sample placements 601, it also serves as means for having one or more radially displaced samples.

An illustrative example of an axial/radial indexer 502, shown in detail in FIG. 6, is located outside of the thermally controlled environment 27 in the ambient space 23. It comprises a rod or arm 49 connected to the sample holder 20, and it passes through the movable base 22 through a rotating bushing 42. This bushing 42 is equipped with a pin 43 that engages a longitudinal groove 44 parallel with axis X of 44 in said extension 49. Since the pin 43 is firmly attached to the bushing 42, a rotation of the bushing 42 will correspondingly rotate said extension. To axially displace the extension, a linear actuator 45 is used. The axial displacement is indicated by a linear position transducer 650 coupled 651 to linear actuator 45. The end of the extension 49 is terminated in a powerful disk magnet 48, which is in contact with a corresponding size steel disc 46, or another oppositely polarized disk magnet connected rigidly to the moving end 47 of the linear actuator 45. The magnet 48 and steel disk 46 may be reversed. Inasmuch as the magnet 48 is strongly attracting the steel in line with X, but very weakly in any other direction, rotational slippage between the surfaces of 46 and 48 is permitted, but with no gap developing between them. In this coupling, an accurate axial X displacement 140 is ensured concurrent with unhindered and accurate rotation 141 around axis X for radial indexing. Rotary actuation is obtained with an actuator 51 such as a gear motor or a stepper motor, coupled to an internal or external rotary transducer 201, such as a potentiometer or encoder, thereby also coupled to bushing 42 by connecting means 52 such as a timing belt, a gear, or an o-ring belt. Various parts may supplement the actuator, transducer, magnet functions, and their interaction, as are knowns in the art to accomplish a concurrent rotational and lateral actuation.

Thus, means for holding at least two samples comprises the sample holder, FIG. 5, 20, equipped at least two sample placement cavities, FIG. 5, 601, on its cylindrical surface radially displaced from each other, inside sleeve 21, and connected to the axial/radial indexer FIG. 5, 502.

3. Temperature Rise Detector

Still referring to FIG. 5, the pulse source 504 may be located below the thermally controlled environment 500 shell 510 and temperature rise detector 505 on the top, or in reverse. Sideway orientation is possible but is generally more difficult to achieve. FIG. 5 shows 505, the temperature rise detector, which may be an intrinsic or beaded thermocouple or an optical radiation detector (not shown), used for sensing the temperature rise of the face B, which is opposite the illuminated face, A, of a sample 1 in the test position, after receiving an energy pulse.

4. LED Pulse Source

Figure 11:
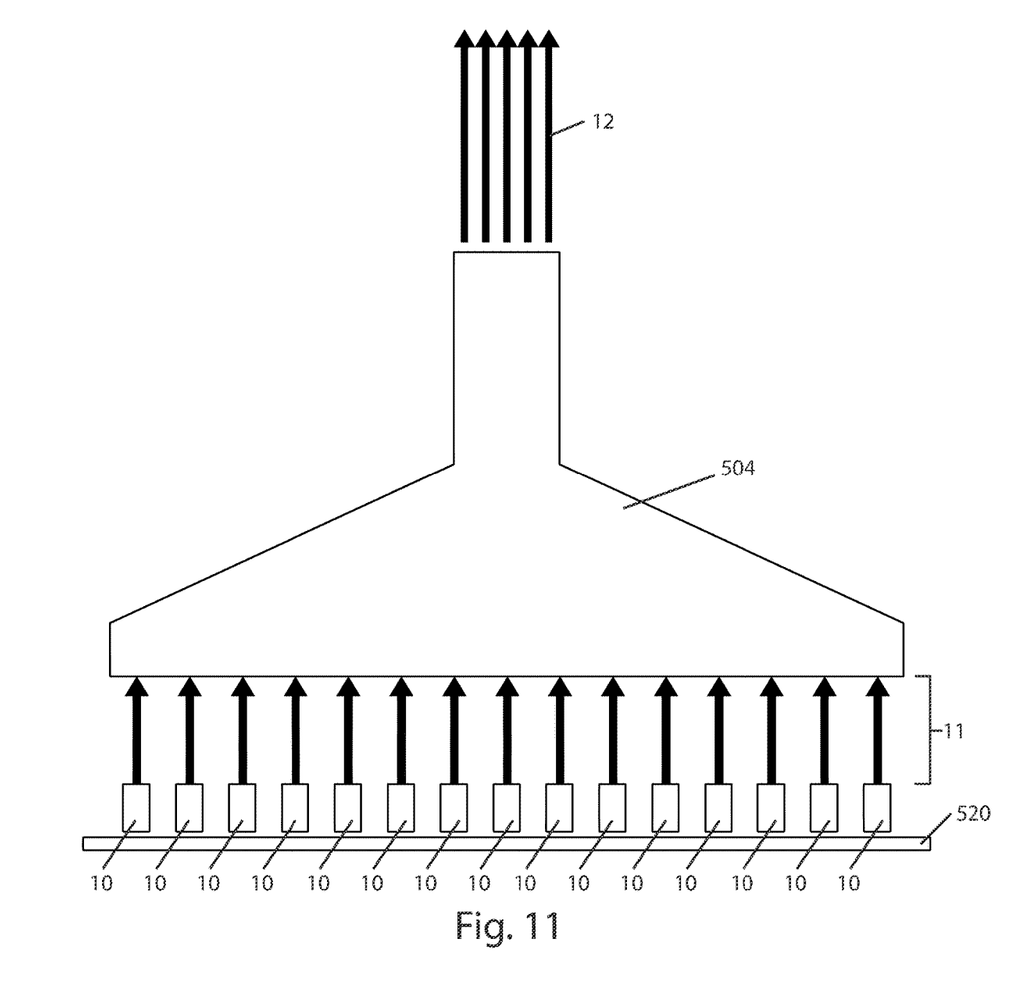
FIG. 11 is a plane view of an embodiment of the LED light pulse source of this disclosure.

In the present disclosure, as illustrated in FIG. 11, the light source is at least one Light Emitting Diode (LED) 10, singularly or in an array. This LED light source, made up of one or several LEDs is the means providing a pulse source produces minimal electrical noise by only switching low voltage electric current (typically <100 V DC) into a quasi-resistive load. Prior art devices which utilize lasers or Xenon flash tubes in the course of generating a short pulse of light by discharging large high voltage capacitor and very high voltage (>10,000V), trigger pulses to initiate the discharge both of which generates a tremendous amount of electrical noise. In addition, high voltage lasers are hazardous to use. For lasers or Xenon flash tubes it is difficult to control the pulse width of the light pulse. In contrast, controlling the pulse width of an LED it is simple, precisely controllable as it turns on and off upon command with extremely sharp rise and decay times (<0.01 ms), and produces variable intensity in response to controlled voltage levels. Use of LED also lowers cost, imparts added safety and reduces complexity of the device.

The energy density of most currently available LEDs is usually insufficient by itself, as compared to the needed energy for the test, therefore it may be considered to use a plurality of LEDs in an array. Using at least one LED 10, the light emitted 11, which may or may not be concentrated 15 first, is formed into a columnated beam consisting of bundle of parallel rays 12. This highly columnated light beam travels through passages FIG. 5, 514, into the interior of the environmental space 27 and into the thermal volume 513, as shown in FIG. 5, without appreciable loss of energy delivered to face A of the sample lined up to its optical axis Y. In an alternate embodiment at least one laser diode may be incorporated in place of an LED.

From any combination of single or multiple LEDs or LED arrays 11, placed on a base 520, shown in FIGS. 11, the light emitted 11 may be concentrated or shaped by conventional optical means, such as a combination of lenses 504, then columnating or transmitting members, such as optical fibers, or light pipes 521 to form a parallel ray bundle 12. There may be multiple methods to concentrate with columnate, and transmit light as are known in the field.

These various configurations have one common denominator in that they are used to concentrate the light output 11 of a single LED or multiple LEDs in an array operated in a pulse mode, to a high-power density columnated light beam 12, resulting in power density sufficient to produce the desired 0.1-3° Celsius (C) thermal excursion of face B of the sample.

5. Improved Data Analysis Scheme

Due to the energy density of the light pulse being somewhat limited by what may be provided by an LED, or to other experimental reasons, it may be necessary to employ longer pulses of light, to obtain the necessary total energy input to the sample and produce a well measurable temperature rise, on face B, FIG. 5 of the sample 1, ranging from 0.1 to 3° C. for most materials.

The analysis in the operating and analysis software of the present disclosure largely overcomes the problems noted above, which were caused by heat losses and thermogram distortions due to finite length pulses. In prior art corrections for these were derived by manipulating post-test data, according to theoretical considerations. Since all of the factors are interacting, a correction for heat loss and a separate correction for finite pulse width rarely produce satisfactory results without numerous tests. The aim in these cases was to manipulate test data with the inclusions of theoretical corrections, to a point where the test data closely fits the theoretically perfect thermogram.

Figure 12:
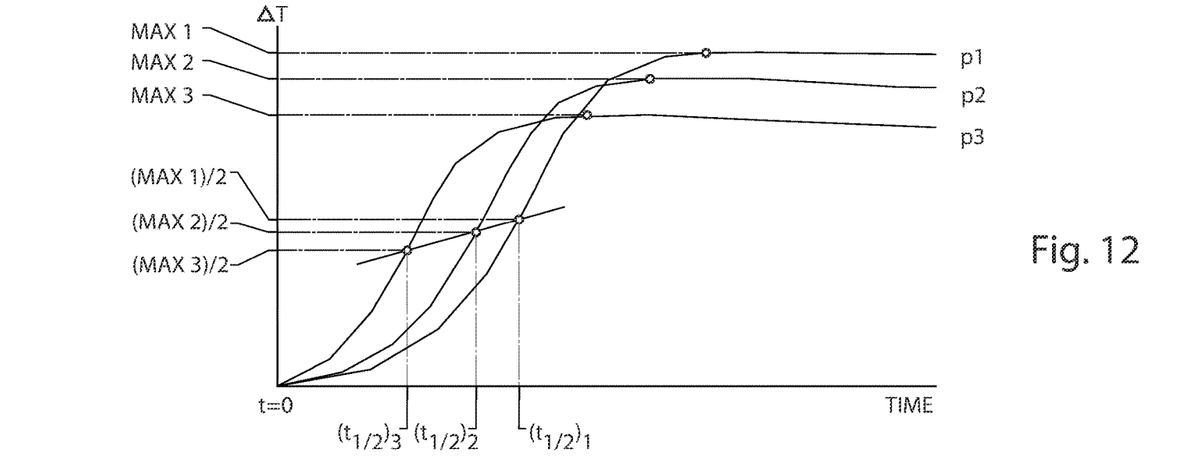
FIG. 12 is a graph illustrating multiple thermograms obtained with different duration light pulses and the interrelations of characteristic points.
Figure 13:
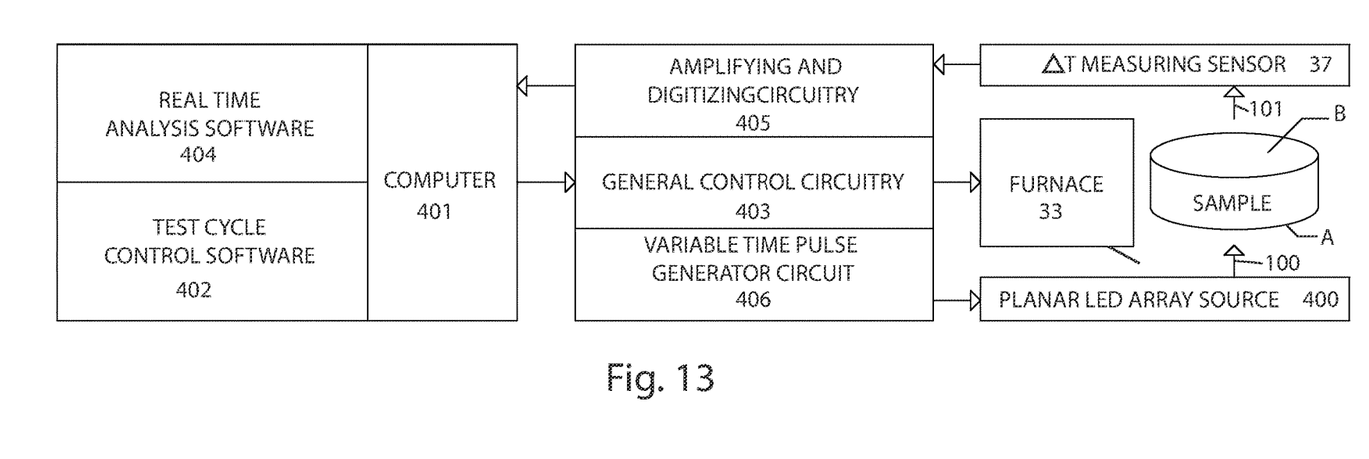
FIG. 13 is a block diagram of the operational elements of an embodiment of the present disclosure.

In contrast, the disclosed device is able to vary on command both the intensity and the duration of the pulse to produce a sequence of different width pulses which can be iterated to a desired outcome within the same test cycle, essentially in real time. Thus, the method is operating on all interacting factors combined by using sequential pulses of varied parameters, as they appear in real time. As shown in FIG. 12, in a test cycle, for a particular material sample, a sequence of at least two pulses, designated $P_1$ and $P_2$, but may be three or more with $P_3$ naming the third pulse and $P_x$ for those following, each with specific durations is used, then $t_{1/2}$ computed for each case and this $t_{1/2}$ data is stored in a database thereby providing means for calculating thermal diffusivity from the thermogram. The database may be housed, stored, or saved on a storage device of a computer. For example, the shortest pulse $P_1$ generates maximum temperature rise of Maxi. From that, $(t_{1/2})_1$ is computed and is derived by the method described earlier. Similarly, $(t_{1/2})_2$ and $(t_{1/2})_3$ are derived for pulses $P_2$ and $P_3$, respectively, wherein $P_3$ is the longest pulse and $P_2$ is greater than $P_1$. The pulses used are of different durations, in increasing or decreasing order of duration magnitudes. Temporal displacements of the resulting thermograms and their corresponding $t_{1/2}$ are then analyzed in terms of their corresponding pulse widths at constant pulse intensity. By applying linear or higher order regression analysis to the sequence of $t_{1/2}$ values as a function of pulse duration, the resultant function is extrapolated to a very short pulse duration where $t_{1/2}$ is much less than 100 times the duration of the corresponding pulse, then the resultant $t_{1/2}$ is used in Equation 1. The purpose of this procedure is to keep errors 1% or below. The numbers of multiple pulses for this analysis is at least two. By varying the pulse intensity, the extent of the temperature rise of the rear face B can be further optimized as well and defined.

For real time analysis the evaluation of each thermogram associated with a pulse is analyzed individually right after the thermogram is defined. Then the regression analysis is performed after the last pulse in the desired sequence while the sample's thermal environment has not changed substantially. Based on the statistical parameters of the regression, and a determination of whether the results are acceptable, either further pulse sequence with altered parameters of intensity and pulse wide are iterated, or the test proceeds to the next temperature point. Alternately the analysis can be done posttest, but without the benefit of real time iterations using varied parameters as describe above.

FIG. 11 depicts a block diagram for the operation of a flash diffusivity system, using the light source, comprised of at least one LED source 400, described in this disclosure. As usual, arrows show signal flow. A computer 401 houses a software program 402 to control heating or cooling of the thermal environment 27, being a thermally controlled environment 27 for instance, FIG. 5, 513, via general control circuitry 403, and real time analysis software programmed as described above 404 to perform the real time improved analysis. Upon software programmed command, a Variable Pulse Time Generator circuit 406 is triggered, which then turns "ON" and "OFF" the LED source 400 for a predetermined period of time at a desired intensity. The resultant light pulse impinges on a Sample FIG. 5, 1 and causes its front face A, FIG. 5, 1 temperature to rapidly rise, and heat from it travel through the sample and eventually result in a gradual temperature rise of its rear face B, which is measured continuously by the temperature rise detector, shown as $\Delta T$ Measuring Sensor. The output of this detector is conditioned by amplifying and digitizing circuitry 405, and the digital equivalent of the electrical signal is passed back to the computer 401 and software program 404 housed thereon for analysis and determination of the thermal diffusivity.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. An instrument for measuring thermal diffusivity of solid materials, the instrument comprising:
   a. a furnace for creating a thermally stable environment;
   b. an LED array light source capable of raising the temperature of at least one sample by an emitted light pulse from it;
   c. a sample holder for holding at least two samples radially displaced from each other;
   d. the LED array light source for illuminating a first side of the at least one sample;
   e. a temperature rise detector for reading a temperature change of a second side of the at least one sample and recording a thermogram after a light pulse to the first side is deposited;
   f. a computer for calculating the thermal diffusivity from the thermogram; and
   g. sample placements having the at least two radially displaced samples each part of a row of axially displaced samples,
   wherein the furnace for creating providing the thermally stable environment further comprises programming to provide a plurality of pulses according to proportional-integral-derivative (PID) control principles to heat said sample to a desired temperature first, and reach a thermally stable condition before the measurement pulse is issued.

2. The instrument of claim 1, wherein the computer for calculating the thermal diffusivity of at least one sample comprises a software program which calculates thermal diffusivity using a sequence of at least two light pulses of predetermined and different durations, denoted $P_1$, $P_2$, each having a $t_{1/2}$ associated with it, denoted $(t_{1/2})_1$, $(t_{1/2})_2$, and having at least two said $t_{i,2}$ values subject to a regression analysis versus their corresponding pulse durations, and the resultant function then extrapolated to a pulse duration that is shorter than 100 ms to obtain the corresponding $t_{1/2}$, which is then used in the calculation: $a = c \cdot L^2/t_{1/2}$, where $c=0.13879$ and L is the thickness of the sample.

3. The instrument of claim 1, wherein the LED array light source further comprises:
   a. at least one LED;
   b. a light concentrator; and
   c. a light transmitting columnator.

4. The instrument of claim 1, wherein the LED array light source further comprises at least one laser diode.

5. The instrument of claim 1, wherein the sample holder for holding at least two samples radially displaced from each other further comprises an axially and radially moving sample holder, a stationary sleeve, and an indexer, to move the sample holder in reference to the stationary sleeve wherein the sample holder comprises at least two cavities radially displaced from each other, the at least two interconnected and concentric cavities having one opening larger than the other, placed 180° from each other, and the sleeve comprising at least two openings each at least as wide as the large opening of the at least two cavities and oriented 180° from each other on the surface.

6. The instrument of claim 5, wherein the sample holder and sleeve are withdrawn from the thermal environment for sample loading and unloading.

7. The instrument of claim 5, wherein the at least two cavities are parallel with the longitudinal axis of the sample holder and are radially displaced from each other and wherein each row of axially displaced samples includes at least one sample cavity.

8. The instrument of claim 5, wherein the at least two cavities extend through the sample holder and each comprises an opening on a first side and an opening on a second side, the opening on the first side being larger than the opening on the second side, and the openings are concentric with each other, and are along an axis with this axis being perpendicular to the longitudinal axis of the sample holder.

9. The instrument of claim 5, wherein the sample holder is cylindrical in shape.

10. The instrument of claim 5, wherein the sample holder has a polygonal cross section.

11. The instrument of claim 5, wherein the indexer moves the sample holder axially and radially in reference to the sleeve while the sleeve's position remains unchanged.

* * * * *